H. W. THOMAS.
ANTI AIRCRAFT AND SUBMARINE HOWITZER
APPLICATION FILED SEPT. 16, 1920.

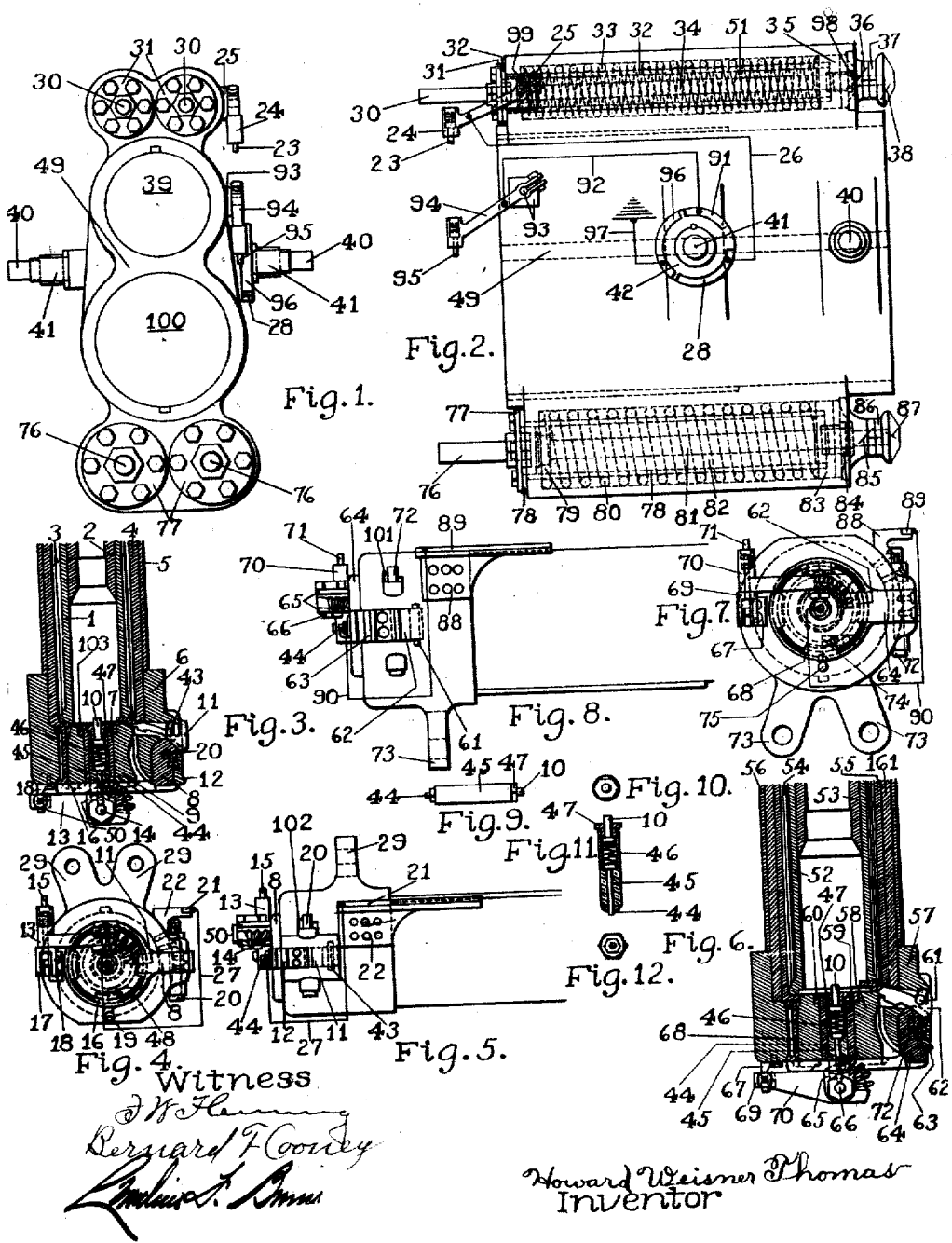

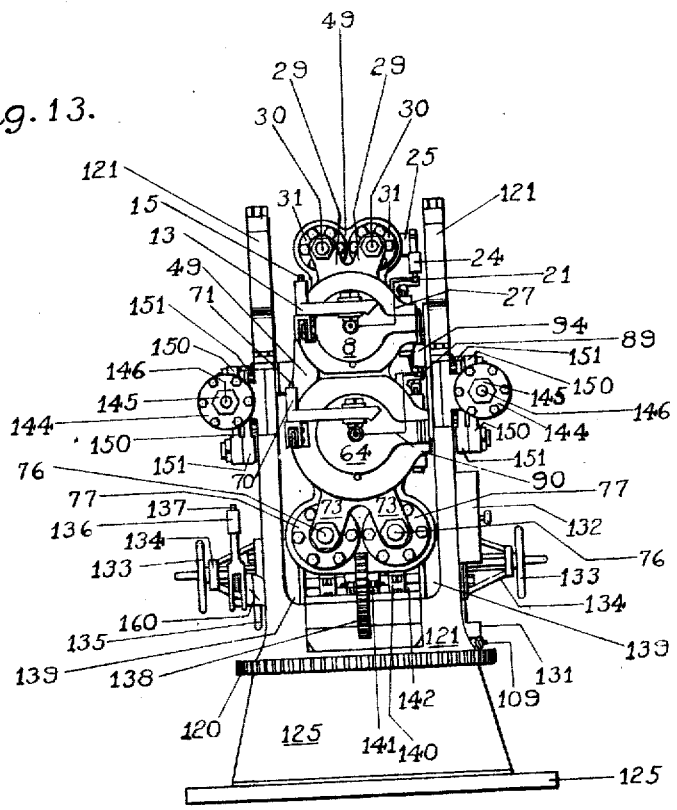

1,377,292.

Patented May 10, 1921.
7 SHEETS—SHEET 3.

Witness

Howard Weisner Thomas
Inventor

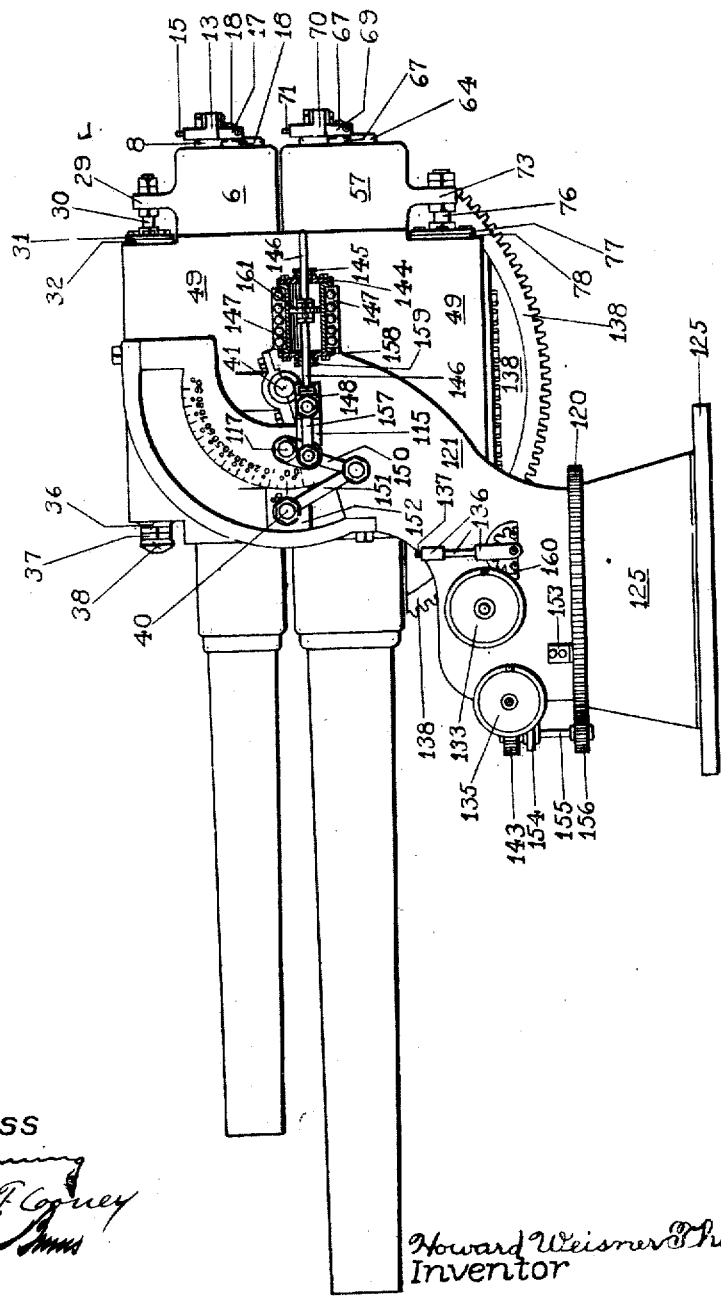

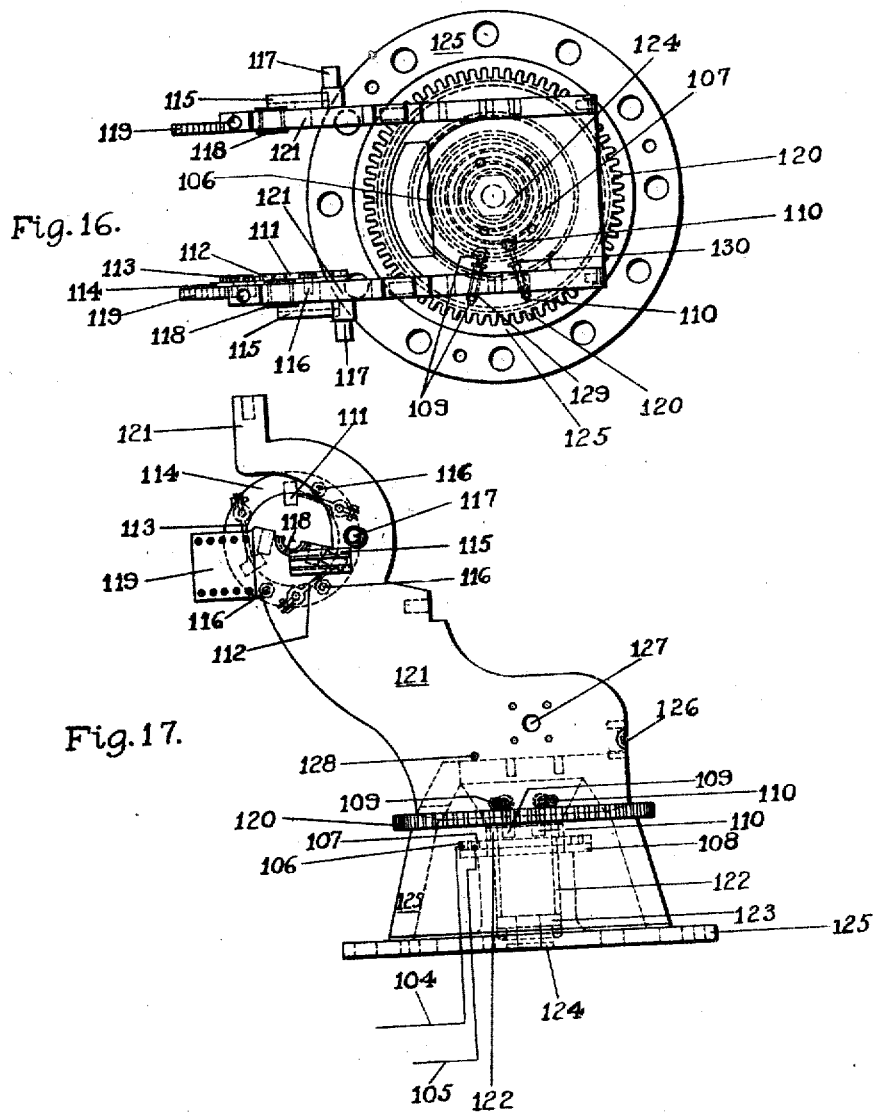

H. W. THOMAS.
ANTI AIRCRAFT AND SUBMARINE HOWITZER.
APPLICATION FILED SEPT. 16, 1920.

1,377,292.

Patented May 10, 1921.
7 SHEETS—SHEET 6.

Witness

Howard Weisner Thomas
Inventor

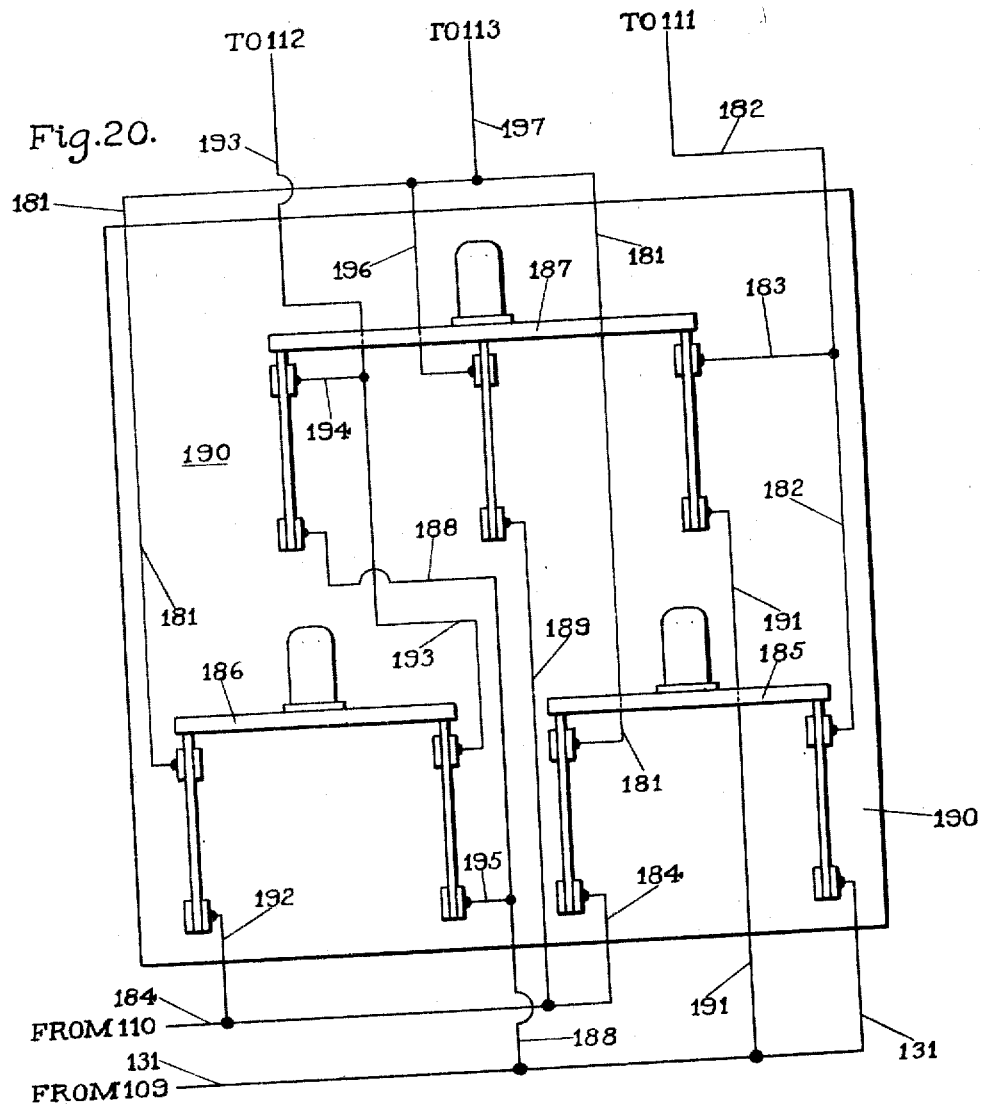

UNITED STATES PATENT OFFICE.

HOWARD WEISNER THOMAS, OF TROY, NEW YORK.

ANTI AIRCRAFT AND SUBMARINE HOWITZER.

1,377,292.	Specification of Letters Patent.	Patented May 10, 1921.

Application filed September 16, 1920. Serial No. 410,807.

*To all whom it may concern:*

Be it known that I, HOWARD WEISNER THOMAS, a citizen of the United States, residing at Troy, in the county of Rensselaer and State of New York, have invented a new and useful Anti Aircraft and Submarine Howitzer, of which the following is a specification.

My invention relates to the improvements in cannons in which two cannons are superimposed in a common cradle and supported upon a pedestal or mount; and the objects of my improvements are, first, to provide a howitzer of long range for anti-aircraft defense capable of firing vertically into the air when necessary without undue delay; second, to provide a howitzer for anti-submarine defense having a long range and capable of being fired from an angle of fifteen degrees below horizontal up to and including an angle of elevation of sixty-five degrees, beyond which position it cannot possibly be fired; third, to allow that each of the two howitzers can be fired either independently or jointly from an angle of fifteen degrees depression up to and including an elevation of sixty-five degrees beyond which point only the anti-aircraft howitzer can be fired; fourth, to provide a howitzer capable of more rapid operation in firing; fifth, to afford a comparatively light mobile howitzer of moderate proportions for mounting on a motor truck or on board a ship; sixth, to provide a howitzer having a high muzzle velocity and therefore permitting a greater angle of descent of the projectile; seventh, to afford a suitable firing mechanism for the howitzers.

I attain these objects by the mechanism illustrated in the accompanying drawings, in which—

Figure 14:
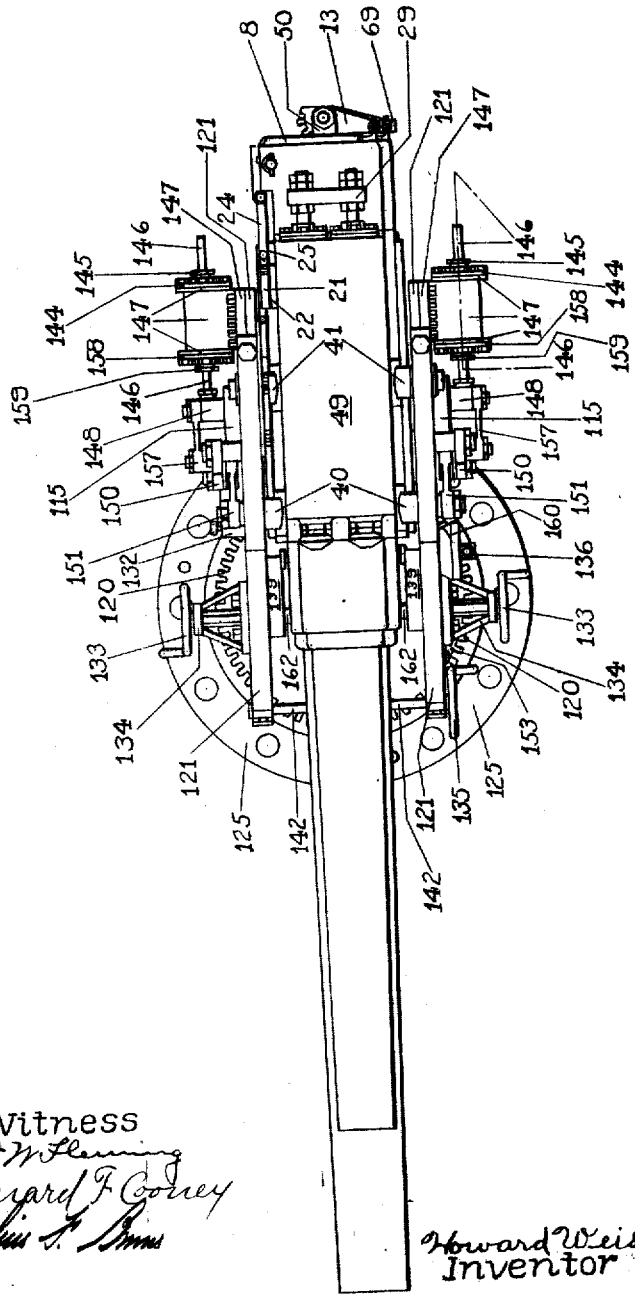
Figure 19:
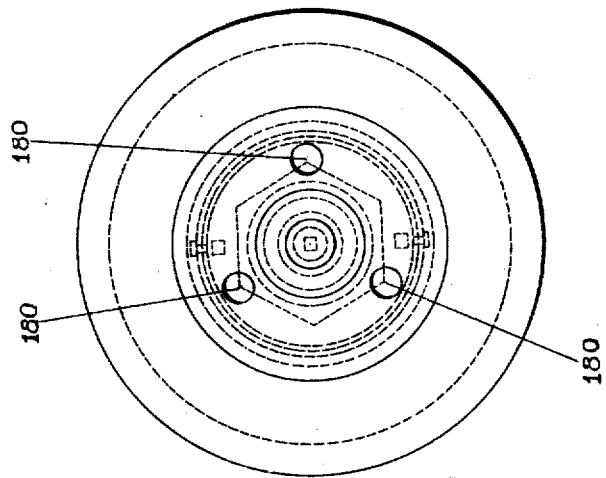
Figure 18:
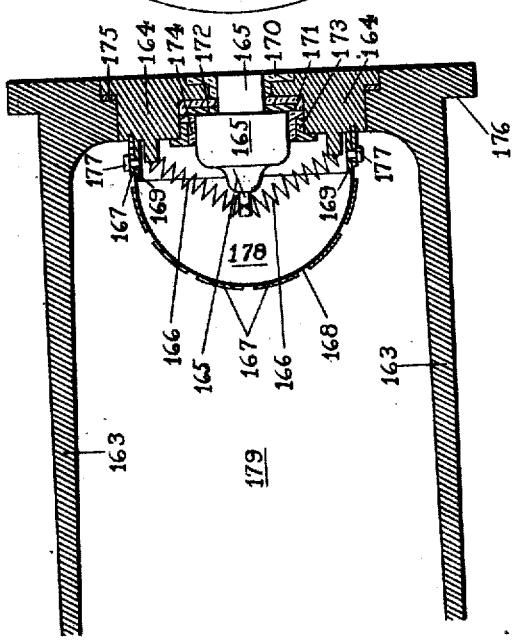

Figure 1 is a rear elevation of the cradle; Fig. 2 is a side elevation of the cradle; Fig. 3 is a plan and section of the anti-aircraft howitzer unit; Fig. 4 is a rear elevation of the anti-aircraft howitzer unit; Fig. 5 is a side elevation of the anti-aircraft howitzer unit; Fig. 6 is a plan and section of the anti-submarine howitzer unit; Fig. 7 is a rear elevation of the anti-submarine howitzer unit; Fig. 8 is a side elevation of the anti-submarine howitzer unit; Fig. 9 is a side elevation of the electric firing contact mechanism; Fig. 10 is a front elevation of the electric firing contact mechanism; Fig. 11 is a plan and section of the electric firing contact mechanism; Fig. 12 is a rear elevation of the electric firing contact mechanism; Fig. 13 is a rear elevation of the assembled howitzer complete; Fig. 14 is a plan of the assembled howitzer; Fig. 15 is a side (left) elevation of the assembled howitzer; Fig. 16 is a plan of the pedestal and pivot yoke; Fig. 17 is a side elevation of the pedestal and pivot yoke; Fig. 18 is a plan and section of the electric fuse; Fig. 19 is a rear elevation of the electric fuse; Fig. 20 shows the arrangement of the firing circuit switches.

Similar numerals refer to similar parts throughout the several views.

The howitzer (Figs. 3, 4, 5) is built up of alloy steel, brass, and wire. It is of the sub-caliber type, built up of sections and consists of a base tube 1, which extends the full length of the gun; this tube 1 is shrunk on over a sub-caliber tube 2 which extends from the front of the tube 1 to a point near the rear allowing sufficient space in the rear of tube 1 for the shell case as shown in Fig. 3. The wirewinding is placed on the tube 1 and extends from the rear shoulder on tube 1 as shown to a point considerably beyond the length of the powder chamber. This wirewinding 3 is done under a tension of sixty thousand pounds per square inch. A jacket 4 runs from the rear of the tube 1 and is provided with a shoulder as shown (Fig. 3) at the rear. This jacket is shrunk on over the tube 1 and wirewinding 3 and extends beyond the wirewinding at both ends. The breech ring 6 is shrunk on over the rear end of jacket 4 and is provided with a shoulder. (Fig. 3.) This breech ring forms the recess for the breech mechanism and is provided with a recess which contains the extractor 11 and its trunnion 43. On the top of the breech ring 6 two lugs 29 are provided to form points of attachment for the recoil and counter-recoil systems. The brass jacket 5 encircles the gun in the rear and forward of the breech ring 6 and is provided with a shoulder which acts as a recoil guide to relieve any unnecessary strain on the recoil pistons and piston-rods. This brass jacket 5 is secured to the howitzer by counter-sunk screws and acts as a bushing when the howitzer recoils in the cradle 49.

The breech block 9 is of the interrupted-screw type and is provided with four-threaded and four-slotted sectors. On a semi-circular boss on the rear face of the breechblock are cut gear teeth (Fig. 4), in which the gear teeth of the operating lever bevel gear mesh. The lower end of the circular boss on which the gear teeth are cut serves as a stop to limit the rotation of the block to the unlocked position. This lower end of the circular boss comes in contact with a hardened-steel stop 48 riveted to the inner face of the block carrier. A radial lug projects from the inner surface of the breechblock and engages an L-shaped groove cut in the hub 7 of the block carrier, so that when the mechanism is unlocked no relative movement between the breechblock and carrier 8 can take place. The breechblock 9 is concentrically mounted in the breech of the howitzer, with reference to the axis of the bore, and is concentrically mounted on the hub 7 of the block carrier 8, in such a position that the axis of the firing contact 10 is always in line with the bore of the howitzer. The nut 103 in the front end of the breechblock serves to retain the block in position on its carrier hub 7. The point of the firing contact 10 is always in contact with the pole piece of the fuse when the howitzer is loaded. The block will be practically locked before any contact between the firing contact point 10 and the pole 165 located in the cartridge case can take place. The firing contact 10 is provided with a shoulder a short distance in the rear of its forward end, which comes in contact with the rear face of the fiber bushing 47 to prevent the spring 46 from forcing it out of its seat when the block is opened. The loading tray 16 is located in the breech recess and serves to protect the two lowest threaded sectors in the breech recess from becoming bruised by the cartridge during the process of loading. Its middle portion is cut away for the purpose of clearing the lowest threaded sector on the block when the block is closed. The loading tray 16 is locked to the gun by the tray latch when the breech is open. This latch is located in the rear lower face of the breech ring and engages a slot in the rear lip of the tray. The latch is so located that as the carrier strikes the face of the breech it forces the latch to disengage its seat in the tray. As the block rotates its lowest threaded sector which engages the tray causes the latch to rotate, its front and rear lips sliding on seats provided for that purpose. The stop 19 serves to prevent further motion of the tray latch shown immediately above the stop 19.

The firing mechanism is of the electric type. It consists of a fiber case 45 threaded on the outside. This case houses the terminal rod 44, the contact spring 46, the contact terminal 10, and the fiber bushing 47 (Figs. 9, 10, 11, and 12). All parts are inserted from the forward end. The terminal rod 44 screws into the rear from the forward end of case 45 in order to vary the tension on spring 46. The fiber cap 47 serves to retain the contact terminal 10 in position and acts as a bushing. This bushing prevents further motion of the terminal 10 when in contact with the shoulder near the rear end of the terminal. The firing mechanism is located in the hub 7 of the block carrier.

The handle of the operating lever 13 is drilled to receive the lever latch shaft. This shaft contains a collar or shoulder which engages a spring located in the handle and retained therein by a shoulder. This shaft extends through the handle and is provided with a thread on its lower end to engage the thread in fork 17. The latch catch 18 is located on the rear of the breech ring. The latch can be released by pressure on the button 15 which is an extension of the shaft. The inner end of the lever is provided with bevel gear teeth (Fig. 3), which mesh with corresponding teeth on the breechblock and serves as a means for opening and closing the breech mechanism. The lever is supported between two lugs 50 (Fig. 5) on the rear of block carrier 8 and is held in position by a pivot 14. The block carrier 8 is hinged n its right side to the howitzer by means of the hinge pin 20. It is provided with a central, inwardly projecting hub 7, upon which the breechblock 9 is concentrically mounted. The hub 7 is bored out concentrically and threaded to receive the firing contact case 45. The block is held in place on its hub by means of the nut 103. Two lugs 50 are formed on the rear face of the carrier just above the center. These lugs 50 form a seat for the operating lever 13. In the lower right-hand quadrant on the inner face a hardened-steel block stop 48 is riveted. This stop prevents the rotation of block in the open position. On the right side of the carrier a recess is formed which serves to operate the extractor 11.

The extractor 11 is located in the extractor seat. It is operated by a hardened-steel pallet 12 on the right face of the carrier arm, which serves to impart a quick blow at the end of the swing of the carrier in opening the breech mechanism. The extractor 11 rolls on its forward surface and is retained in position by the extractor trunnion 43 sliding in grooves formed in the top and bottom of the seat. A lip on the extractor engages the rim of cartridge case and serves to eject the cartridge.

The latch is fitted in a seat in the operating lever 13 and serves to lock the handle from rotation, and consequently prevents rotation of the breechblock.

The hinge pin is a hardened-steel pin 20 ground to fit and is held in place by a catch 102 fitted to its upper end.

The howitzer firing contact unit is located on the right side of the howitzer and forward of the carrier arm pivot 20. It consists of a copper bus-bar 21 (Figs. 4 and 5) secured by counter-sunk screws to an insulating support arm 22 which is secured to the howitzer breech ring by screws. The arm or bracket 22 and the bus-bar 21 recoil with the howitzer in its cradle 49 (Figs. 1 and 2). The bus-bar 21 is provided with a smooth surface for the brush 23 (Figs. 1 and 2) which is supported by its holder 24 and forms a sliding contact on the copper bus-bar 21. A wire 27 is securely soldered onto the rear of the bus-bar 21 and the opposite end of the wire is securely fastened to the terminal rod 44 (Figs. 4 and 5) of the electric firing contact mechanism (shown in Figs. 9, 10, 11, and 12) located in the hub 7 of the block carrier 8. The wire 27 is covered by an insulating material except where it is secured to the bus-bar 21 and the terminal rod 44.

The howitzer shown in Figs. 6, 7, and 8 is built up of alloy steel, brass, and wire. It is also of the sub-caliber type and is of larger caliber. It is built up of sections and consists of a base tube 52, which extends the full length of the gun; this tube 52 is shrunk on over a sub-caliber tube 53 which extends from the front end of tube 52 to a point near the rear of this tube allowing sufficient space in the rear of tube 52 for the shell case as shown in Fig. 6. The wirewinding 54 is placed on the tube 52 and extends from the rear shoulder on tube 52 as shown (Fig. 6) to a point considerably beyond the length of the powder chamber. This wirewinding is done under a tension of sixty thousand pounds per square inch. A jacket 55 runs from the rear of the tube 52 and is provided with a shoulder as shown (Fig. 6) at the rear. This jacket is shrunk on over the rear end of tube 52, and wirewinding 54 and extends the entire length of the gun. The jacket 161 is shrunk on over the rear end of jacket 55 and extends from the rear end of jacket 55 to a point beyond the front end of the wirewinding 54. The inside of jacket 161 is provided with shoulders which come in contact with shoulders provided for this purpose on the outside surface of jacket 55. The breech ring 57 is shrunk on over the rear end of jacket 161 and is provided with a shoulder as shown (Fig. 6). This breech ring 57 forms the recess for the breech mechanism and is provided with a recess which contains the extractor 62 and its trunnion 61. On the bottom of the breech ring 57 two lugs are located. These lugs 73 are provided to form points of attachment for the recoil and counter-recoil systems. The brass jacket 56 encircles the gun in the rear and forward of the breech ring and is provided with a shoulder or rib which acts as a recoil guide to relieve any unnecessary strain on the recoil pistons and piston-rods. This brass jacket 56 is secured to the howitzer by counter-sunk screws and acts as a bushing during the howitzer recoil in the cradle 49.

The breechblock 58 is of the interrupted-screw type and is provided with four-threaded and four-slotted sectors. On a semi-circular boss on the rear face of the breechblock are cut gear teeth (Fig. 7), in which the gear teeth of the operating lever 70 bevel gear mesh. The lower end of the circular boss on which the gear teeth are cut serves as a stop to limit the rotation of the block to the unlocked position. This lower end of the circular boss comes in contact with a hardened-steel stop 74 riveted to the inner face of the block carrier 64. A radial lug projects from the inner surface of the breechblock 58 and engages an L-shaped groove cut in the hub 59 of the block carrier, so that when the mechanism is unlocked no relative movement between the breechblock and carrier can take place. The breechblock 58 is concentrically mounted in the breech of the howitzer, with reference to the axis of the bore, and is concentrically mounted on the hub 59 of the block carrier 64, in such a position that the axis of the firing contact 10 is always in line with the bore of the howitzer. The nut 60 in the front end of the breechblock 58 serves to retain the block 58 in position on its carrier hub 59. The point of the firing contact 10 is always in contact with the pole piece of the fuse when the howitzer is loaded. The block will be practically locked before any contact between the firing contact point 10 and the pole 165 located in the cartridge case (Fig. 18) can take place. The firing contact 10 is provided with a shoulder a short distance to the rear of its forward end, which comes in contact with the rear face of the fiber bushing 47 to prevent the spring 46 from forcing it out of its seat when the block is opened. The loading tray 68 is located in the breech recess and serves to protect the two lowest threaded sectors in the breech recess from becoming bruised by the cartridge during the process of loading. Its middle portion is cut away for the purpose of clearing the lowest threaded sector on the block when the block is closed. The loading tray 68 is locked to the gun by the tray latch when the breech is open. This latch is located in the rear lower face of the breech ring and engages a slot in the rear lip of the tray. The latch is so located that as the carrier strikes the face of the breech it forces the latch to disengage its seat in the tray. As the block rotates its lowest threaded sector which engages the tray causes the latch to rotate, its front and rear lips sliding on seats provided for that purpose. The stop 75 serves to prevent further motion of the tray latch shown immediately above the stop 75.

The firing mechanism is of the electric type and is an exact duplicate of that used in the anti-aircraft howitzer unit. This firing mechanism is so constructed that it can be interchanged from one howitzer unit to the other. The firing mechanism is located in the hub 59 of the block carrier 64.

The operating lever 70 (Figs. 6, 7, and 8) is constructed in the same manner as that for the anti-aircraft unit (Figs. 3, 4, and 5). The latch shaft is located in the handle of lever 70 and is secured to the latch fork 69. This fork 69 engages a catch 67 secured to the left side of the howitzer. The latch fork 69 is disengaged from the catch 67 by pressure on the release button 71 located on the top of operating lever 70. This operating lever is provided with gear teeth (Fig. 6) precisely as the one on the anti-aircraft howitzer unit, which mesh with corresponding teeth on the breechblock 58 and serves as a means for opening and closing the breech mechanism. The lever 70 is supported between two lugs 65 (Fig. 8) on the rear of block carrier 64 and is held in position by a pivot 66.

The block carrier 64 is hinged on its right side to the howitzer by means of the hinge pin 72. It is provided with a central, inwardly projecting hub 59, upon which the breechblock 58 is concentrically mounted. The hub 59 is bored out concentrically and threaded to receive the firing contact case 45. The block is held in place on its hub by means of the nut 60. Two lugs 65 are formed on the rear face of the carrier just above the center. These lugs form a seat for the operating lever 70. A hardened-steel stop 74 is riveted in the lower right-hand quadrant on the inner face of the carrier 64. This stop prevents the rotation of block in the open position. On the side of the carrier a recess is formed which serves to operate the extractor 62.

The extractor 62 is located in the extractor seat. It is operated by a hardened-steel pallet 63 on the right face of the carrier arm, which serves to impart a quick blow at the end of the swing of the carrier in opening the breech mechanism. The extractor rolls on its forward surface and is retained in position by the extractor trunnion 61 sliding in grooves formed in the top and bottom of the seat. A lip on the extractor 62 engages the rim of cartridge case and serves to eject the cartridge.

The latch is fitted in a seat in the operating lever handle and serves to lock the handle from rotation, and consequently prevents rotation of the breechblock 58. The hinge pin is a hardened-steel pin 72 ground to fit and is held in place by a catch 101 fitted to its upper end.

The howitzer firing contact unit is located on the right side of the howitzer and forward of the carrier arm pivot 72. It consists of a copper bus-bar 89 (Figs. 7 and 8) secured by counter-sunk screws to an insulating support arm 88 which is secured to the howitzer breech ring 57 by means of screws. The arm or bracket 88 and the bus-bar 89 recoil with the howitzer in its cradle 49. (Figs. 1 and 2.) The bus-bar 89 is provided with a smooth surface for the brush 95 (Figs. 1 and 2) supported in its holder 94 which brush forms a sliding contact on the copper bus-bar 89. A wire 90 is securely soldered onto the rear of the bus-bar 89 and the opposite end of the wire is securely fastened to the terminal rod 44 of the electric firing contact mechanism (shown in Figs. 9, 10, 11, and 12) located in the hub 59 of the block carrier 64. The wire 90 (Figs. 7 and 8) is covered by an insulating material except at the points where it is secured to the bus-bar 89 and the terminal rod 44.

The cradle 49 (Figs. 1 and 2) supports the anti-aircraft howitzer shown in Figs. 3, 4 and 5 in its position 39, and also supports the anti-submarine howitzer shown in Figs. 6, 7, and 8 in its position 100. The cradle consists of the housing for the spring cylinders, the housing for the two howitzers, the cradle trunnions, and the cradle cross-head recoil trunnions. The cradle contains the recoil and counter-recoil systems for each of the two howitzers, and each system operates independently of the other. To the right cradle trunnion is attached the elevation segment fire control circle.

The elevation segment fire control circle consists of a fiber (insulation) wheel on whose circumference is mounted three copper strips secured to this wheel by counter-sunk screws. This wheel 42 is secured to the trunnion 41 by a key and its key-way. Two of the copper strips 28 and 96 respectively, are of sufficient length to permit a motion of one hundred and five (105) degrees from one extreme to the other. The third strip 91 is of shorter length to permit a motion of only eighty (80) degrees from one extreme. A wire 92 is securely soldered to the strip 91 and runs to the rear of the cradle to the lower brush-holder 94 to which its opposite end is securely soldered. Another wire 97 is securely soldered to the strip 96 (Figs. 1 and 2) and grounded on the cradle as shown. Another wire 26 is securely soldered to strip 28 and runs to the rear of the cradle and is securely soldered to the top brush-holder 24. All wires are covered with an insulating material except where they are soldered to their respective terminal points. The top and lower brush-holders 24 and 94 respectively, are supported by fiber shafts 25 and 93; these fiber shafts are secured to the side of the cradle 49 by counter-sunk screws and the holes filled in with sealing wax in order to avoid the possibility of a grounding of the brush-holders.

The cradle trunnions 41 are located slightly to the rear of the center of cradle 49 and form a means of support. These trunnions are located on each side of the cradle. The right cradle trunnion carries the elevation segment fire control circle whose function is to control the firing of the howitzers at various angles. The trunnions 41 are supported in the trunnion bearings 118 (Figs. 16 and 17) located in the pivot yoke 121.

The cradle cross-head recoil trunnions 40 are located a short distance to the rear of the front end of cradle 49 (Figs. 1 and 2) and are located on both sides. Besides acting as a point of support for the cradle cross-heads these trunnions also form a point of attachment for the cradle recoil link chain 151, 150 and 157. (Figs. 13, 14, and 15.)

The recoil and counter-recoil systems are identical in construction and operation. The rear part of the counter-recoil spring 80 (Fig. 2) for the anti-submarine howitzer has been omitted in the drawing (Fig. 2) for the purpose of clearness. Each howitzer recoil and counter-recoil system is composed of two units located side by side, each unit an exact duplicate. The anti-aircraft recoil and counter-recoil system units are located in the top housing of the cradle 49. (Figs. 1 and 2.) The recoil cylinders 32, which are inserted from the rear, fit inside the springs 33, and their rear cylinder-heads 31 are secured or connected to the lugs 29 on the howitzer (Figs. 3, 4 and 5) through the rods 30, so that the cylinders recoil with the howitzer and compress the counter-recoil springs 33. The piston-rods 34 are located within the recoil-cylinders 32 near the rear end and from this position (opposite and a slight distance to the rear of the center of the brush-holder bracket 25 attached to the right-hand outside of the cradle 49) the piston-rods 34 extend forward, passing through the front cylinder-heads 35, through the stuffing-box and its follower 98 in the front cylinder-heads 35, and through the spring cylinder-heads 36 to which the said piston rods 34 are attached by means of nuts 37 and 38. The piston-rods 34 are provided with a shoulder near the front end in order to engage the rear face of the spring cylinder-heads 36. The piston-rods 34 terminate in a buffer on the rear end, said buffer being provided with a shoulder on the rear end and threaded to receive the bronze collar 99. This collar 99 is threaded on its inner surface and screws on over the buffer of the piston-rod 34 from the forward end, and the outside surface of this said collar 99 tapering slightly toward the rear. The piston-rods 34 remain stationary during recoil and counter-recoil since they are attached to the spring cylinder-heads 36 in the forward end of the cradle 49. The recoil-cylinders 32 are not stationary for these are attached to the rear cylinder-heads 31 which in turn are attached to the rods 30. The rods 30 are attached to the rear cylinder-heads 31 by a nut on the rear face of the cylinder-head, and also by a nut on the forward face of the cylinder-head 31; this nut on the forward face of the said cylinder-head 31 is located inside of the recoil-cylinder 32 at the rear end. The spring cylinder-heads 36 are screwed into the front ends of the spring cylinders, and transmit the piston-rod pull back to the spring cylinders. They also serve to retain the springs 33 when the howitzer lugs 29 are disconnected from the rear cylinder-heads 31. The pistons and rods are of forged steel in one piece, and the pistons 34 are finished to receive a bronze liner 99 which is screwed on from the front and rests against a shoulder. The recoil cylinders 32 are of forged steel and finished throughout. They are threaded at the front end to receive the cylinder-heads 35, and three or more throttling grooves fourteen (14) inches long are cut into the inside surface near the rear end. These throttling grooves are of uniform width and varying depth. Gaskets are used to seal the joints between the cylinders and cylinder-heads. The stuffing-boxes in the front cylinder-heads 35 are of the usual type, being provided with a bronze follower 98 and using a good hydraulic waterproof packing. Filling and drain holes for the reservoirs 51 are located in the front cylinder-heads 35 and are closed by screw-plugs. When fired the howitzer recoils in the cradle 49 carrying with it the recoil-cylinders 32, and thereby compressing the counter-recoil springs 33. A small portion of the energy is spent in compressing these springs, but the greater portion of the energy is expended in driving the oil located in the reservoir 51 of the recoil cylinders 32 to the rear side of the piston through the throttling grooves. Since the width of the grooves is uniform, and the depths proportional then the areas of the orifices will vary with the position of the cylinder during recoil, and with the aid of the counter-recoil springs 33. a constant resistance is offered throughout the length of recoil. The forward pressure on the piston-rods during counter recoil is transmitted to the spring cylinder-heads by a shoulder on the piston-rods where they enter the spring cylinder-heads. The counter-recoil buffer 99 is tapered so that during counter recoil the escape of oil through the varying diametrical clearances between the buffers and the walls of their recess will offer such resistance as will control the motion of the gun during its return and finally bring it to rest without shock when the howitzer is fully in battery. The recoil and counter-recoil systems for the anti-submarine howitzer is composed of two units located side by side in the lower housing of the cradle as shown (Figs. 1 and 2). Each unit is an exact duplicate of the other that is they are identical in construction and operation with that of the anti-aircraft units described above. In assembling the recoil and counter-recoil systems (anti-submarine units) the counter-recoil springs 80 are inserted from the front end of the spring cylinder housings. The cylinders 78 are inserted from the rear into the inside of the counter-recoil springs 80. The piston-rods 81 with their buffers 79 are inserted from the rear end of the cylinders 78 and slid forward to near their positions at the rear end of the throttling grooves cut in the rear portion of these cylinders 78. The cylinder-heads 83 are passed over the front end of pistons 81 and screwed onto the front end of the cylinders 78 to engage the springs 80 taking care to have the filling and drain holes in these cylinder-heads 83 in the same vertical plane. The flange on the rear end of the cylinders 78 will prevent the springs from pulling the cylinders into the housings. The stuffing-box located in the cylinder-heads 83 is then packed and the followers 84 are then screwed in place. The rear cylinder-heads 77 are secured to the cylinders 78 by stud bolts in the rear flange of the cylinders. The piston-rods 76 are secured to the rear cylinder-heads 77 by means of nuts on both the front and rear sides. Now completely fill the reservoirs 82 in the cylinders 78 with a good quality of light oil and then remove about one-half pint from each. Screw in the filling plugs. The spring cylinder-heads 85 are passed over the front end of the piston-rods 81 and screwed into the spring cylinder housing. The nuts 86 are drawn up until the shoulder on the pistons 81 engage the rear face of the cylinder-heads 85. The nuts 87 are screwed onto the front end of the piston-rods 81. The piston-rods 76 are secured to the howitzer lugs 73 by nuts and serve as a means of connection between the howitzer and its recoil and counter-recoil systems. All joints between cylinders and cylinder-heads are sealed by packing.

The pivot yoke 121 (Figs. 16 and 17) is made of cast steel. The pivot fits into the bearings 122 and 123 (Figs. 16 and 17) in the pedestal 125 and supports at its top a table, from which rise two arms forming the yoke and furnishing support for the other parts. The traversing wormwheel shaft bearings 126 are located in the front of the pivot yoke arms just above the table as shown. (Figs. 16 and 17.) Near the top and rear of the arms are bronze-lined trunnion bearings 118 for the support of cradle 49. (Figs. 13, 14, and 15.) They are fitted with cap-square bolts to the arms. Part of the top and front of the arms are cut away as shown (Fig. 17) to form a bed or surface for the cradle-recoil cross-heads 152. (Fig. 15.) On both sides near the top of the arms an extension 119 is provided, a portion of which is removed for the purpose of attachment for the cradle-recoil cylinders 147. (Figs. 14 and 15.) A pivot 117 is provided on the outside of each arm. This pivot 117 is located in the same horizontal plane with the center of the trunnion bearings 118 and forms a point of support for the cradle-recoil link chain 151, 150, and 157. (Figs. 14 and 15.) The cross-head guide 115 is located on the outside of each arm as shown (Figs. 16 and 17) and forms a part thereof. On the inside of the right arm is located the brush-holder yoke 114. This yoke is secured by bolts 116 to the pivot yoke arm and so located that the center of the yoke 114 and the center of the trunnion bearings 118 and therefore the center of the cradle trunnions 41 in its bearings 118 coincide. The brush-holder yoke 114 is made of fiber and is provided with three shafts located an equal distance apart. These shafts on this yoke are for the purpose of forming points of support for the brush-holders 111, 112, and 113 respectively as shown. These brush-holders are provided with brushes which make contact on the elevation segment fire control circle located on the right trunnion of the cradle previously described. In the lower part of the right pivot yoke arm two insulating tubes 129 and 130 respectively (Figs. 16 and 17) are located. These tubes extend completely through this pivot yoke arm and function as a support for the brush-holders 109 and 110 respectively, insulating them from the pivot yoke 121. These brush-holders contain brushes which transmit the electric firing power supply from bus-bars 106 and 107 located in the pedestal 25. (Figs. 16 and 17.) On the outside near the bottom of the arms are the elevating handwheel shaft brackets 134 (Figs. 13, 14), and directly opposite them between the arms 121 on the table are located the elevating gear bearings which are bolted in position in the holes shown in Figs. 16 and 17. The holes 127 are provided for the elevating handwheel shaft, an elevating handwheel being located on both sides of the mount. (Figs. 13, 14, and 15.) Holes 128 are provided for the elevating mechanism brake shaft. Part of the table in the rear is cut away to permit clearance for the rear of the larger howitzer to pass and also serves as an opening for inspecting the inner portion of the pedestal. The pivot yoke 121 extends through the pedestal as shown in Fig. 17 and is secured to the pedestal 125 by means of a nut 124.

The pedestal 125 (Figs. 16 and 17) is made of cast steel, and has the general form of the frustum of a hollow cone united at its top to a cylindrical section, and at its bottom to a circular base, in the flange of which are drilled holes for twelve (12) foundation bolts and three (3) leveling screws. The exterior of the cylindrical part is finished and at the top of which is cut gear teeth 120. These gear teeth (Figs. 16 and 17) extend entirely around the top of pedestal thereby permitting a field of fire of three hundred and sixty (360) degrees. In the bottom of the pedestal is cast an annular boss, bushed with the bronze bearing 123 on the interior surface and forming the lower bearing of the pivot yoke. The upper cylindrical section of the pedestal is also bushed with a bronze bearing 122 which extends down to the bearing 123 on its interior surface and forms the upper bearing for the pivot yoke 121. The weight of the traversing parts is supported by a thrust bearing at the lower end of the pivot yoke, resting on the base of the pedestal within the annular boss referred to above. This annular boss is also provided with a shoulder on its outside surface near the top as shown (Fig. 17) for the purpose of supporting the insulating disk 108. (Fig. 17.) This insulating disk 108 is made of fiber, on the top surface of which two countersunk copper rings are secured by means of counter-sunk screws. One of these copper rings 106 is fastened to this fiber disk so that the outside circumference of this ring and that of the fiber disk correspond. The other copper ring 107 is located a short distance in from the copper ring 106 leaving a portion of the fiber disk between these copper rings. The copper rings are sufficiently counter-sunk to provide a smooth surface over the entire top surface of the disk 108 and its copper rings 106 and 107 respectively. The fiber disk 108 is retained in its position on the annular boss and prevented from turning by a key and key-way. A wire 104 is securely soldered to the copper ring 106 and run through the lower part of the pedestal 125. Another wire 105 is securely soldered to the copper ring 107 and run through the lower part of pedestal. These wires are covered by an insulating material except where they are soldered to their respective terminals. These wires 104 and 105 are connected to the electric power supply lines in order to supply power for firing the electric fuse located in the shell case. (Fig. 18.)

The azimuth circle is located on the top of the cylindrical section of the pedestal 125 in the rear of the gear teeth 120. Every tenth division is numbered and the micrometer attachment or indicator 153 (Figs. 14 and 15) located on the left arm of the pivot yoke is graduated to tenths of a degree.

The elevating mechanism consists of the segmented gear 138 secured to the lower face of the cradle 49 (Fig. 15), an idler spur gear meshing with this segmented gear 138 secured to the cradle, and a spur gear meshing with the idler. The spur gear which meshes with the idler gear is mounted on the shaft 162 (Fig. 14) on whose outer ends a hand wheel 133 is secured. The brackets 134 serve to support the outer ends of the handwheel shaft 162. Between the pivot yoke arms two wheels are mounted on the shaft 162 to provide a surface for the action of the friction brake bands 139. (Fig. 14.) The brake bands are of the contracting type and are controlled by the lever 136. (Figs. 13, 14, and 15.) The brake latch catch 160 (Figs. 13, 14, and 15) is provided with teeth for engaging the brake latch, the release 137 of which is located at the top of the lever 136. (Figs. 13, 14, and 15.)

The traversing mechanism consists of a worm 141 (Fig. 13) which meshes with the spur gear 143 (Fig. 15) mounted on the shaft 155 on whose lower end another spur gear 156 is mounted. This lower spur gear 156 meshes with the gear teeth 120 located on the top of pedestal 125. (Fig. 15.) The thrust bearing 154 supports the shaft 155 containing the spur gears 143 and 156. On the left outer end of the wormwheel shaft 142 a handwheel 135 (Figs. 13, 14, and 15) is secured. Thrust bearings 126 are provided for the wormwheel shaft 142 where it passes through the front of the pivot yoke arms 121. (Fig. 17.)

The cradle-recoil system is designed to check the motion of the cradle on firing the howitzer. The cradle 49 is provided with a trunnion 40 on each side near its front end. On these trunnions 40, the cross-heads 152 are secured. These cross-heads slide on the surface of the pivot yoke arm as shown in Fig. 15 and are retained by the guard shown on the top. To these trunnions 40 on the outside of the cross-heads 152 one end of the links 151 are attached. (Figs. 13, 14, and 15.) To the lower ends of links 151 are attached the lower ends of links 150, the top ends of these links being pivoted to the sides of the pivot yoke arms 121 on the pivots 117. (Figs. 13, 14, and 15.) Slightly below the pivot points 117 on the links 150 are attached one end of the links 157 (Figs. 14 and 15), the links 150 being provided with a pivot for this purpose. The opposite end of the links 157 being secured to the cross-heads 148 (Figs. 14 and 15) which is mounted in the cross-head guides 115.

(Figs. 14 and 15.) The cylinder 147 is bolted onto the rear projection 119 (Figs. 13, 14, and 15) of the pivot yoke arm 121. A cross-section of this cylinder 147 on the line 146 (Fig. 14) is shown in Fig. 15. One end of the piston-rod 146 is secured in the rear of the cross-head 148 (Figs. 14, and 15) passing through the front stuffing-box cap 159, the front stuffing-box in the cylinder-head 158, and the front cylinder-head 158 terminating in the front end of the piston 161. Another piston-rod 146 extends through the rear stuffing-box cap 145, the rear stuffing-box located in the rear cylinder-head 144, and through the rear cylinder-head 144 terminating in the rear face of the piston 161. On the inner surface of the cylinder 147 two small throttling grooves are cut. These grooves are of uniform width and depth, and whose areas are such that will permit just sufficient oil to escape past the piston 161 and its walls as will permit the cradle to either be raised or lowered slowly by the elevating mechanism being operated by one man. Filling and drain holes are located in the rear cylinder-heads 144 and are closed by cap screws. These filling and drain holes are located in the same vertical plane. The friction brakes located on the elevating handwheel shaft serve to retain the howitzer at its desired angle of elevation but when the howitzer is fired the cradle will tend to run either up or down as this depends upon which unit is fired. This cradle recoil is checked by the friction brakes and the resistance the oil in the cylinders 147 offers in passing to the rear or front (as the case may be) of the pistons 161. (Fig. 15.) The motion of the cradle 49 is transmitted to the pistons 161 (Fig. 15) through the links 151, 150, 157, the cross-head 148, and the forward section of piston-rod 146.

The azimuth indicator is located on the left arm of the pivot yoke slightly above the gear teeth 120 located on the top of pedestal (Figs. 14 and 15). It is graduated in tenths of a degree.

The elevating or range indicator is located on the left arm of the pivot yoke and opposite the cradle cross-head 152. (Fig. 15.) The indicator is graduated in degrees, every ten degrees being marked. A vernier attachment is located on the cradle cross-head 152 (Fig. 15), this vernier being graduated in tenths of a degree.

The electric fuse is located in the rear end of the shell case 163. (Figs. 18 and 19.) It consists of a resistance 166 which is heated to incandescence by the application of electric power applied to the pole piece 165 by the firing contact mechanism located in the hub of the breech-block carrier of the howitzers. This pole piece 165 is insulated from the shell case 163 by the fiber insulating bushings 170, 171, and 174 arranged as shown in Fig. 18 which is a plan and section of the shell case. The brass disk 172 rests against the shoulder of pole piece 165 so as to protect the insulating bushing 171 from the direct pressure of the explosion exerted upon the pole piece 165. The brass screw-cap 173 is provided to retain the fiber bushing 174 in position. The fiber bushing 170 screws into the rear of the plug 164. This plug 164 screws into the rear of the shell case 163 and is provided with a ring of packing 175 near the rear to prevent the possible escape of gases from the powder chamber to the rear when fired. Three holes 180 (Fig. 19) in the rear of the plug 164 are provided for a spanner wrench when desiring to remove this plug from the shell case for reloading the fuse and priming chamber. On the front face of the plug 164 on opposite sides of the pole piece 165 two square projections are provided for connecting the outside ends of the resistance 166, the middle of the resistance being connected on the pole piece 165. These square projections on the plug 164 are the ground terminal points for the resistance 166. To the flange 169 provided on the front face of the plug 164 is attached the hemispherical tin shell 167 secured to this flange 169 by the screws 177. This shell 167 is provided with holes for the escape of the priming discharge located in the space 178 around the resistance 166. These holes are covered with a single thickness of leaf tinfoil 168 to prevent leakage of the priming charge in storage or transit. When fired the leaf tinfoil 168 will melt and the powder located in the powder chamber 179 around the hemispherical shell 167 in the shell case 163 becomes ignited and the discharge of the projectile from the gun takes place. The flange 176 on the rear of shell case is provided to form a surface of contact on the shell for the engagement of the shell extractor located in the breech of the howitzers.

The firing control panel is mounted in the iron panel box 132 (Figs. 13 and 14) which is attached to the right pivot yoke arm 121. The slate panel 190 (Fig. 20) mounts three knife-switches, two of these switches 185 and 186 are of the two-pole single-throw type, the third switch 187 being of the three-pole single-throw type. These switches in association with the elevation segment firing control circle exercise complete control of the firing of both howitzer units. One end of the feed wire 131 is connected to the right blade of the lower right-hand switch 185, its opposite end being connected to the shaft of the brush-holder 109 (Figs. 13 and 17) located in the lower part of pivot yoke 121. One end of the feed wire 184 is connected to the left blade of lower right-hand switch 185, its opposite end being connected to the shaft of the other brush-holder 110 (Fig. 17) located in the lower part of pivot yoke 121. A wire 191 is connected to the feed wire 131 and secured to the right outside blade of the three-pole switch 187. A wire 189 is connected to the feed wire 184 and secured to the center blade of the three-pole switch 187. The wire 188 is connected to the feed wire 131 and secured to the left outside blade of the three-pole switch 187. A wire 195 is connected to the feed wire 188 and secured to the right blade of the lower left-hand switch 186. The wire 192 is connected to the feed wire 184 and secured to the left blade of the lower left-hand switch 186. The wire 181 is connected to the upper left-hand lug of the switch 186 and terminates on the upper left-hand lug of the switch 185. To this wire 181 another wire 196 is connected and terminates on the center upper lug of the three-pole switch 187 as shown in Fig. 20. The wire 197 is connected to the line 181 and terminates on the elevation segment wire control circle brush-holder 113 located near the top of the right pivot yoke arm 121 (Fig. 17). A wire 182 is connected to the upper right-hand lug of the lower right-hand switch 185 and terminates on the elevation segment fire control circle brush-holder 111 located near the top of the right pivot yoke arm 121. (Fig. 17.) The wire 183 is connected to the wire 182, its opposite end terminating on the upper outside lug of the three-pole switch 187. Line 193 is connected to the upper right-hand lug of the lower left-hand switch 186 and terminates on the elevation segment fire control circle brush-holder 112 located near the top of the right pivot yoke arm 121. (Fig. 17.) All wires are covered except at terminal points on switches and brush-holders by an insulating material. All lines (feed lines and distributing lines) leading to and from the iron panel box 132 (Figs. 13 and 14) should be inclosed in flexible armor conduit. The lower left-hand switch 186 controls the firing of the anti-aircraft howitzer unit, and the lower right-hand switch 185 controls the firing of the anti-submarine howitzer unit up to and including an elevation of sixty-five (65) degrees of the howitzer above horizontal; beyond which point of elevation of sixty-five (65) degrees the elevation segment fire control circle functions in preventing this howitzer (the anti-submarine unit) from being fired at a greater elevation than sixty-five (65) degrees above horizontal. It will be seen (Fig. 20) that the three-pole switch 187 for firing both howitzers jointly is merely a shunt circuit around the two lower switches 185 and 186. The firing circuits are of the open type circuit and all the switches are in the donwward position when not in actual firing service.

In assembling the howitzer, the lower pedestal bearing 123 is first placed in position (Fig. 17) and next the upper pedestal bearing 122. The pedestal bus-bar supporting disk 108 mounting the circular bus-bars 106 and 107 is keyed to the cylindrical boss on the shoulder provided for this purpose on the inside of the pedestal 125. (Fig. 17.) Two wires 104 and 105, are connected to the bus-bars 106 and 107 respectively, one wire being connected to each bus-bar. These wires are run through the lower part of the pedestal as shown. (Fig. 17.) Now place the fiber tubes 129 and 130 (Fig. 16) in position shown in the lower right-hand side of the pivot yoke arm 121; then insert the shafts of the brush-holders 109 and 110 respectively in these tubes 129 and 130. (Figs. 16 and 17.) Lower the pivot yoke 121 into its bearings 122 and 123 in the pedestal 125 tilting the pedestal sufficiently to allow the nut 124 to be placed on the lower extreme of the pivot yoke 121. (Fig. 17.) Insert the brushes under their tension springs in the brush-holders 109 and 110 through the opening provided in the rear of the table of the pivot yoke 121. (See Figs. 13, 16 and 17.) These brushes will make contact on the circular bus-bars 106 and 107 located in the lower part of pedestal 125. Mount the elevating hand-wheel shaft brackets 134 (Figs. 13 and 14) and insert the elevating hand-wheel shaft 162 in its position 127 (Fig. 17) and mount the gear and friction brake wheels thereon. Place the shaft bearing brackets 140 in position on top of the table between the pivot yoke arms, also place the idler gear and shaft in this same bracket, provision being made for this construction. Mount the hand-wheels 133 on the outer ends of the elevating shaft 162 (Figs. 13, 14, and 15) placing one on each side. Now secure the segmented gear 138 to the under side of cradle 49. (Figs. 13 and 15.) Secure the elevation segment fire control circle 42 (with the copper segments 91, 28, and 96 secured to its circumference) with its key on the right cradle trunnion 41. (Figs. 1 and 2.) Mount the cross-heads 152 on the trunnions 40 one of which is located on each side of the cradle near the front end. Now hang the brush-holder yoke 114 (Figs. 16 and 17) over the right cradle support trunnion 41 and lower the cradle 49 into its pivot yoke bearings 118 located near the top at the rear of the pivot yoke arms 121. (Figs. 16 and 17.) Now the brush-holder yoke 114 which is hanging on the trunnion 41 is bolted in position on the inside of the right pivot yoke arm by the bolts 116 (Figs. 16 and 17) in such a position that the shaft supporting the lower brush-holder 112 (Fig. 17) is in the same vertical plane as the cradle supporting trunnions 41. Place the brush-holders 111, 112, and 113 in position on their yoke 114 (Figs. 16 and 17) so that the front ends of the holders extend in a counter-clockwise direction as shown in Fig. 17. Secure the brush-holders 94 and 24 to the right side of the cradle 49 as shown in Figs. 1 and 2. Connect these brush-holders with copper wires 92, and 26 to the copper segments 91 and 28 on the elevation segment fire control circle 42 as shown in Fig. 2. Ground the segment 96 on the side of cradle 49 by a wire 97 as shown. (Fig. 2.) Insert the brushes with their tension springs on top into the brush-holders 111, 112, and 113. These brushes will make contact on their respective copper segments 91, 28, and 96 secured to the circumference of the elevation segment fire control circle 42. It will be noted that there are two units compromising the cradle-recoil system, one unit of which is located on the outside of each pivot yoke arm. In assembling this cradle recoil system, mount the two cylinders 147 on the rear projections 119 (Figs. 16 and 17) of the pivot yoke arms 121. Place the piston 161 in these cylinders and secure the front section of the piston-rods 146 in the front face of the piston 161 which is provided with a boss for this purpose. Bolt on the front cylinder-heads 158, pack the stuffing-box in this front cylinder-head and screw in the follower cap 159. Seal all joints between cylinder and cylinder-heads with packing. Connect the front section of the piston-rods 146 in the rear face of the cross-heads 148, which are mounted in the guides 115. (Figs. 16 and 17.) Secure the links 151 on the front cradle trunnions 40 on the outside of the cross-heads 152. Mount the large end of the links 150 on the pivots 117 on the outside of the pivot yoke arms 121 and the lower end of these links 150 are mounted on the links 151 the lower ends of which are provided with a shaft for this purpose. Slightly below the pivot point 117 on the link 150 is a shaft or pin on which is mounted one end of the link 157, and whose (link 157) opposite end is mounted on the cross-head 148 which is provided with a shaft or pin for this purpose. Secure the rear section of the piston-rod 164 in the rear face of piston 161 which is provided with a boss for this purpose. Bolt on the rear cylinder-heads 144 taking care to have the filling and drain holes in these cylinder-heads 144 in the same vertical plane. Pack the stuffing-boxes in these cylinder-heads 144 and screw in the followers 145. Depress the howitzer to its lowest extreme allowable by the cross-heads 152. Notice whether the links 151, 150, and 157 will permit this operation, and granting this operation is successful, elevate the howitzer to its highest extreme allowable by the cross-heads 152. Granting that both these operations are successful proceed to fill both cylinders 147 (one located on each pivot yoke arm Figs. 13, 14, 15, 16, and 17) with a medium light oil. Bolt on the upper cradle-recoil crosshead guides located on the top of the pivot yoke arms 121. (Figs. 13, 14, and 15.) Place the traversing wormwheel shaft 142 (Fig. 14) mounting the worm wheel 141 in its bearings 126. (Figs. 16 and 17.) Mount the thrust bearing 154 (Fig. 15) in position on the front of the pivot yoke table. Place the shaft 155 mounting the gears 156, and 143 in position in this thrust bearing 154. (Fig. 15.) Mount the handwheel 135 on the left side of wormwheel shaft 142. (Fig. 14.) The lower gear 156 on the shaft 155 meshes with the gear teeth 120 on top of the pedestal and permit a field of fire of three hundred and sixty (360) degrees. Mount the azimuth circle to the rear of the gear teeth 120 on the top of pedestal 125. Mount the azimuth indicator 153 to the left arm of the pivot yoke 121 above the azimuth circle. (Figs. 14 and 15.) Mount the elevation quadrant to the outside of the left pivot yoke arm on the right side of the cradle cross-head 152. (Fig. 15.) Mount the elevation quadrant vernier attachment on the left cradle cross-head 152 slightly to the right of the trunnions 40 and directly opposite the elevation quadrant. (Fig. 15.) Depress the howitzer to its lowest extreme which is fifteen (15) degrees, and examine the elevation segment fire control circle on the right cradle supporting trunnion 41. (Figs. 1 and 2.) Make certain that each of the three brushes makes contact on its respective segment. Place the elevating mechanism brake shaft in position and mount the brake bands 139 (Fig. 14) in position over the wheels provided for this purpose on the elevating hand wheel shaft 162 (Fig. 14); and secure the brakeband anchors in position on the inside of pivot yoke arms; attach the brakebands to the brake operating shaft. Mount the brake lever catch 160 on the outside of the left pivot yoke arm 121. (Figs. 13, 14, and 15.) Now mount the brake operating lever 136 on the brake shaft on the left side; assemble the brake latch and release 137. Elevate the howitzer to an angle of exactly sixty-five (65) degrees above horizontal and set the friction brakes 139 (Fig. 14) tightly by pulling the lever 136 (Figs. 13, 14, and 15) as far to the rear as possible. Examine the brush in the brush-holder 111 on the right pivot yoke arm 121. (Figs. 16 and 17.) It will be noted that the brush in this holder 111 is on the verge of breaking contact with the copper segment 91 on the elevation segment fire control circle 42 and the slightest increase in the angle of elevation of the howitzer will cause this brush to move clear of this segment 91 onto the surface of the fiber wheel 42 thereby opening the circuit even though the firing switch 185 (Fig. 20) controlling this circuit may be closed without firing the howitzer (the anti-submarine unit). It will also be noted that the brushes in holders 112 and 113 will maintain contact with their respective segments on the elevation segment fire control circle 42 up to an elevation of ninety (90) degrees (which is the limit of elevation of the howitzer) above horizontal. This condition of contact for the brushes in holders 112 and 113 will permit the firing of the anti-aircraft howitzer unit at an elevation as high as ninety (90) degrees. Now traverse the howitzer three hundred and sixty (360) degrees and note that the brushes in the pedestal brush-holders 109 and 110 make contact on their respective bus-bars 106 and 107 beneath these holders. It will be remembered that the recoil and counter-recoil systems for both howitzer units are constructed similar, are similar in operation and are assembled in the same manner.

Assemble the recoil and counter-recoil systems of both howitzer units as previously described for that of the anti-submarine howitzer. Granting that this is accomplished place the howitzer shown in Figs. 3, 4, and 5 in its position 39 in the cradle 49 (Figs. 1 and 2) with the lugs 29 on the howitzer in an upward position. Fasten the recoil piston-rods 30 in the lugs 29 by the nuts provided for this purpose. It will be observed that the contact segment 21 mounted on the bracket 22 (Figs. 4 and 5) secured on the rear right side of the howitzer is directly under the brush-holder 24 attached to the right rear side of the cradle 49. Insert the brush 23 under its spring in this holder 24 (Figs. 1 and 2.) This brush 23 will now make contact on the segment 21. The howitzer shown in Figs. 6, 7, and 8 is now placed in its position 100 (Figs. 1 and 2) in the cradle 49 with the howitzer lugs 73 in a downward position. Fasten the recoil piston-rods 76 in the howitzer lugs 73 by the nuts provided for this purpose. It will be observed that the contact segment 89 mounted on the bracket 88 secured on the rear right side of the howitzer is directly under the brush-holder 94. Insert the brush 95 under its spring in this holder 94. (Figs. 1 and 2.) The breech mechanism of both howitzer units may now be assembled. The breech mechanism of both howitzer units were constructed similar therefore they are similarly assembled and operated. Place the loading tray 16 (Fig. 3) in its seat in position over the lower treaded sectors of the breech housing. Press on the tray latch sufficiently to force it in its seat properly. Place the extractor 11 in position in its recess (Fig. 3) located on the right side of the howitzer in the breech ring 6. Mount the block carrier arm 8 in its supporting position in the right side of the breech ring 6, force the hinge pin 20 up by hand taking hold of its head, and swinging the carrier 8 back and forth; if the pin sticks, it can readily be forced home in this manner. Secure the hinge pin catch 102 to the upper end of the pin 20. Place the operating lever 13 in position between its two supporting lugs 50 on the rear of the block carrier 8 and with the hand force its pivot 14 in position and secure the locknut on top taking note that the gear teeth cut on the end of this lever 13 extend through the rear of block carrier 8. Mount the block 9 on the carrier hub 7 in such a position that the block stop 48 and the gear teeth cut in the rear face of the block and on the operating lever 13 will mesh properly and permit the proper amount of motion. Place the block locknut 103 on the front of carrier hub 7 to retain the block in position. Mount the block latch in position in the block. Mount the firing mechanism in the block carrier hub 7 by first screwing in the case 45 from the rear, the block being in the open position. Now insert the rod 44 from the rear and turn it engaging the threads on the inside of case 45 until the shoulder on the rod 44 engages the shoulder in the middle of the case 45 (Fig. 11). Secure the nut on the front end of the rod 44. (Figs. 9, 11, and 12 rear.) Insert the spring 46 from the rear and place the contact point 10 with its shoulder against the rear end of spring 46 as shown (Fig. 11). Pass the bushing 47 over the rear end of contact point 10 and screw it as far as possible into the end of the case 45 (Fig. 11). If it is desirable to increase the tension on spring 46 back off the nut on the front end and turn the rod 44 until the desired tension is secured, then again tighten nut on the front end. Now assemble the lever latch by first inserting its spring into the handle of the lever 13. Pass the shaft 15 down through the spring and handle 13 and screw on the latch fork 17 on the lower end of the shaft under the handle 13. Attach the catch 18 on the rear face of the howitzer. (Figs. 3, 4, and 5.) Grasp the handle of the operating lever 13 and move it as far toward the left as possible so as to permit the catch 18 to engage the latch fork 17. The breech mechanism is now in the locked position. Connect a wire 27 to the copper bar 21 which is supported by the bracket 22 secured to the right rear side of the howitzer (Figs. 4 and 5) and the opposite end of this wire 27 connect to the firing mechanism rod 44. (Figs. 4 and 5.) Now assemble the breech mechanism of the anti-submarine howitzer unit (Figs. 6, 7, and 8) precisely as described above for the anti-aircraft howitzer unit. (Figs. 4, 5, and 3.) Having accomplished this now connect up the firing control switches 185, 186, and 187 (Fig. 20)

according to Fig. 20 and as explained. These switches are located in the panel box 132 attached to the right pivot yoke arm 121. (Figs. 13 and 14.) Now connect the two wires 104, and 105 (Fig. 17) respectively to some suitable source of electric power supply. The howitzer is now completely assembled for operation and is shown in Figs. 13, 14, and 15.

To open the breech of the anti-aircraft howitzer unit, grasp the handle of the lever 13; at the same time compress the button 15 on top of the handle by the thumb. This releases the latch 17 from the catch 18 on the rear of the gun. Rotate the lever 13 to the rear. During the first part of the movement of the lever 13 the block 9 and loading tray 16 are rotated to their unlocked positions, at which time the stop on the block comes in contact with the stop 48 on the block carrier 8 and the tray latch opposite its seat 12 in the loading tray 16. The tray latch engages the tray 16 at the moment of swinging the carrier 8 from the breech recess. The block 9 is now locked from further rotation. During further rotation of the operating lever 13 the block 9 and carrier 8 swing about the hinge pin 20 clear of the breech recess, the pallet 12 on the right face of the carrier 8 operates the extractor 11, unseats the cartridge case before the end of the movement, and finally ejects the case free of the howitzer. When another round is inserted the rim or flange of the cartridge case comes in contact with the extractor 11 and forces it partly home. In closing the mechanism the movements are reversed; as the block carrier 8 comes in contact with the breech face of howitzer, the tray latch is forced forward from the stop 19, unlocking the loading tray 16 from the breech ring. Further rotation of the operating lever 13 rotates the breechblock 9 and loading tray 16, causing the threads of the block to engage those in the breech ring. The engagement of threads moves the block 9 forward, and firmly seats the cartridge in the howitzer. At the final motion of the operating lever 13 its latch 17 engages the catch 18, locking the block 9 in the closed position. This howitzer unit is now loaded and ready to be set at the correct range before firing. To open the breech of the anti-submarine howitzer unit, grasp the handle of lever 70, with the thumb exert pressure on the button 71 on top of the handle. This releases the latch 69 from the catch 67 on the rear of the gun. Rotate the lever 70 to the rear. During the first part of the movement the block 58 and the loading tray 68 are rotated to their unlocked positions, at which time the stop on the block comes in contact with the stop 74 on the block carrier 64 and the tray latch opposite its seat 75 in the loading tray 68. The tray latch engages the tray 68 at the moment of swinging the carrier 64 from the breech recess. The block 58 is now locked from further rotation. During further rotation of the operating lever 70 the block 58 and carrier 64 swing about the hinge pin 72 clear of the breech recess, the pallet 63 on the right face of the carrier 64 operates the extractor 62, unseats the cartridge case before the end of the movement, and finally ejects the case free of the howitzer. When another round is inserted the rim or flange of the cartridge case comes in contact with the extractor 62 and forces it partly home. In closing the mechanism the movements are reversed; as the block carrier 64 comes in contact with the breech face of howitzer, the tray latch is forced forward unlocking the loading tray 68 from the breech ring. Further rotation of the operating lever 70 rotates the breechblock 58 and loading tray 68, causing the threads of the block to engage those in the breech ring. The engagement of these threads moves the block 58 forward, and firmly seats the cartridge in the howitzer. At the final motion of the operating lever 70 its latch 69 engages the catch 67, locking the block 58 in the closed position. This gun is now loaded and ready to be set for the correct range before firing. Traverse the howitzer by operating the handwheel 135 (Figs. 13, 14, and 15) located on the left side of the howitzer until the desired angle is indicated by the azimuth indicator 153 located on the left lower outside part of the pivot yoke arm 121 slightly above the gear teeth 120 on top of pedestal 125. (Figs. 14 and 15.) Release the elevating mechanism brakes 139 (Fig. 14) by pressure of the thumb on the button 137 (Fig. 15) of the brake lever 136 moving this lever 136 forward. Now operate either of the handwheels 133 located on both sides of the pivot yoke arms 121 until the desired angle of elevation is indicated by the elevation (or range) quadrant and its vernier attachment located on the outside of the left pivot yoke arm 121 and cradle-recoil crosshead 152 respectfully. (Fig. 15.) Set the elevating mechanism brakes 139 securely by pulling the brake lever 136 to the rear as far as possible. This brake will retain the howitzer at the desired elevation and prevent the weight thereof from causing it to lower itself, besides acting as a check on the cradle recoil. The howitzer (both anti-aircraft and anti-submarine units) is now loaded and set to be fired at a given target. The firing switches are located in the panel box 132 (Figs. 13 and 14), mounted on the right pivot yoke arm 121. First we will fire the anti-aircraft howitzer unit the firing switch of which is the lower left double-pole single-throw switch 186 (Fig. 20). To fire the anti-aircraft howitzer unit grasp the insulated handle (shown in the upright position in Fig. 20) of the switch 186 raising it upward and at the same time inward so that the knife-blades make contact with the upper lugs of the switch shown in Fig. 20. As soon as these blades touch their respective lugs an electric current passes through the switch from the feeders 131 and 184, which are energized by the lines 104 and 105 (Fig. 17) connected to an electric supply source, onto the lines 193 and 197, through the elevation segment fire control circle contacts 28 and 96, through the lines 26 and 97, the brush-holder 24 and its brush 23, the howitzer contact 21, the line 27 into the firing mechanism rod 44, the spring 46, the contact point 10, through the electric fuse 166 in the shell case 163 (Fig. 18), through the shell case 163, and through the cradle 49 causing the resistance 166 (Fig. 18) in the shell case 163 to heat to incandescence thereby igniting the priming charge and powder in the shell case discharging the projectile from the muzzle of the gun. This will cause the howitzer to recoil to the rear in the cradle 49 and is brought to rest by the howitzer recoil and counter-recoil systems. When the howitzer has reached its maximum of recoil and has come to rest it is returned to its former position by the counter-recoil springs. The motion of the howitzer toward the rear in recoil will impart an upward motion to the cradle 49. This upward motion of the cradle is checked by the friction brakes 139 on the elevating mechanism shaft 162 and the cradle-recoil system located on the pivot yoke arms and which is attached to the front cradle trunnions 40 by the links 151. After firing the howitzer return switch 186 to the downward position before reloading is attempted.

Now we will fire the anti-submarine howitzer unit the firing switch of which is the lower right double-pole single-throw switch 185 (Fig. 20). Taking it for granted that the angle of elevation of the howitzer is not greater than sixty-five (65) degrees beyond which elevation it cannot be fired. To fire the anti-submarine howitzer unit grasp the insulated handle (shown in an upright position in Fig. 20) of the switch 185 (Fig. 20) raising it upward and at the same time inward so that the knife-blades make contact with the upper lugs of the switch 185 shown in Fig. 20. As soon as these blades touch their respective lugs an electric current passes through the switch 185 from the feeders 131 and 184 which are energized by the lines 104 and 105 (Fig. 17) connected to some suitable electric supply source onto the lines 182 and 197, through the elevation segment fire control circle contacts 91 and 96, through the lines 92 and 97, the brush-holder 94, and its brush 95, the howitzer contact 89, over the line 90, into the firing mechanism rod 44, the spring 46, the contact point 10, through the electric fuse 166 in the shell case 163, through the shell case, and through the howitzer and cradle 49, causing the resistance 166 (Fig. 18) in the shell case 163 to heat to incandescence thereby igniting the priming charge and the powder in the shell case 163 discharging the projectile from the muzzle of the gun. This will cause the howitzer to recoil to the rear in the cradle 49 and is brought to rest by the howitzer recoil and counter-recoil systems. When the howitzer has reached its maximum of recoil and has come to rest it is returned to its former position by the counter-recoil springs. The motion of the howitzer toward the rear in recoil will impart a downward motion to the cradle 49. This downward motion of the cradle 49 is checked by the friction brakes 139 (Fig. 14) and the cradle-recoil system attached to the pivot yoke arms 121; and which system is connected to the front cradle trunnions 40 by links 151. After firing the howitzer return switch 185 to the downward position before reloading is attempted.

The three-pole single-throw switch 187 (Fig. 20) is for firing both howitzer units at the same moment. It will be seen (Fig. 20) that on closing this switch it will close a shunt circuit around the two lower switches 185 and 186 and will fire both howitzer units unless the angle of elevation of the howitzer is greater than sixty-five (65) degrees in which case it will fire only the anti-aircraft howitzer unit instead of both units; and should this switch remain closed and the howitzer lowered to an angle of sixty-five (65) degrees elevation, it will fire the anti-submarine howitzer unit. Upon firing the howitzer all switches used are immediately returned to their downward or open position before attempting to reload.

I am aware that prior to my invention cannons have been made with one cannon supported on a cradle mounted on a base. I therefore do not claim such a combination; but

I claim:

1. The combination, in a gun mount, of a pedestal, a yoke pivoted thereon, a cradle suspended between the yoke arms, mutual range diverse caliber superimposed gun barrels mounted in said cradle, and semi-automatically governed electric circuits for joint firing of both guns, all substantially as described.

2. The combination, in a gun mount, of a pedestal, a yoke pivoted thereon, a cradle suspended between the yoke arms, superimposed gun barrels mounted in said cradle, electric circuits for firing both guns from the position of fifteen degrees (15°) below horizontal up to an elevation of sixty-five degrees (65°) above horizontal, and automatic means for allowing one gun to be operative at elevations as great as ninety degrees (90°), substantially as set forth.

3. The combination, in a gun mount, of a pedestal, a yoke pivoted thereon, a cradle suspended between the yoke arms, superimposed gun barrels mounted in said cradle, and semi-automatic electric circuits for firing both guns independently, substantially as described.

4. The combination, in a gun mount, of a pedestal, a yoke pivoted thereon, a cradle suspended between the yoke arms, superimposed gun barrels mounted in said cradle, electric circuits for firing both guns up to an elevation of sixty-five degrees (65°), and automatic means for rendering the circuit of one gun inoperative at elevations exceeding sixty-five degrees (65°), substantially as described.

5. The combination, in a gun mount, of a pedestal, a yoke pivoted thereon, a cradle suspended between the yoke arms, superimposed gun barrels mounted in said cradle, each of said barrels being provided with a recoil system, electric circuits for firing each gun, and the aforesaid cradle possessed of an independent recoil system, substantially as set forth.

6. The combination, in a gun mount, of a pedestal, a yoke pivoted thereon, a cradle suspended between the yoke arms, superimposed howitzers mounted in said cradle, electric circuits for firing each howitzer, the said electric circuits composed of circular pedestal busbars and brush contacts, firing switches, a cradle trunnion commutator device with brush contacts, howitzer outside busbars with cradle brush contact elements, breech firing contact elements, an electric firing shell fuse, and a cradle ground connection, substantially as described.

July 26, 1920.

HOWARD WEISNER THOMAS.

It is hereby certified that in Letters Patent No. 1,377,292, granted May 10, 1921, upon the application of Howard Weisner Thomas, of Troy, New York, for an improvement in "Anti Aircraft and Submarine Howitzer," errors appear in the printed specification requiring correction as follows: Page 9, line 24, for the word "wire" read *fire;* same page, line 64, for "donwward" read *downward;* page 12, line 22, for the numeral "12" read *19;* and that the said Letters Patent should be read with these corrections therein that the same may conform to the record of the case in the Patent Office.

Signed and sealed this 14th day of June, A. D., 1921.

[SEAL.]

WM. A. KINNAN,
*Acting Commissioner of Patents.*

Cl. 89—37.